(12) United States Patent
Kaneyasu et al.

(10) Patent No.: US 9,156,626 B2
(45) Date of Patent: Oct. 13, 2015

(54) WORK METHOD AND WORK DEVICE (71) Applicant: HONDA MOTOR CO., LTD., Tokyo (JP)

(72) Inventors: Kensaku Kaneyasu, Tochigi (JP); Kaoru Shibata, Tochigi (JP); Mitsutaka Igaue, Tochigi (JP); Yushi Aoki, Tochigi (JP); Shoji Matsuda, Tochigi (JP); Kazuki Akami, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 13/937,319

(22) Filed: Jul. 9, 2013

(65) Prior Publication Data
US 2014/0007398 A1    Jan. 9, 2014

(30) Foreign Application Priority Data

Jul. 9, 2012    (JP) ................................ 2012-153201

(51) Int. Cl.
*B23Q 17/00*       (2006.01)
*B23P 19/00*       (2006.01)
(Continued)

(52) U.S. Cl.
CPC .............. *B65G 47/00* (2013.01); *B62D 65/028* (2013.01); *B62D 65/18* (2013.01); *B23P 21/008* (2013.01); *F16F 15/002* (2013.01); *Y10T 29/49774* (2015.01); *Y10T 29/53539* (2015.01)

(58) Field of Classification Search
CPC ............ B65G 47/00; B23Q 1/26; B23Q 1/30; B65D 65/028; B65D 65/18; Y10T 29/49764; Y10T 29/49771; Y10T 29/49774; Y10T 29/49778; Y10T 29/53539; B23P 21/008
See application file for complete search history.

(56) References Cited

U.S. PATENT DOCUMENTS 3,001,581 A * 9/1961 Emery et al. ................... 162/377
3,818,290 A * 6/1974 Harper et al. ................... 318/39
(Continued)

FOREIGN PATENT DOCUMENTS

DE   102007036002 A1 *  2/2009  ............. B23Q 17/09
JP       11084680 A *  3/1999  ................ G02F 1/13
(Continued)

OTHER PUBLICATIONS

Machine English translation of JP 11084680.*
(Continued)

*Primary Examiner* — Essama Omgba
(74) *Attorney, Agent, or Firm* — Rankin, Hill & Clark LLP (57) ABSTRACT

High precision work is performed on a work target (workpiece) during conveyance, irrespective of the oscillations accompanying conveyance. A work method includes steps of: predicting a predicted oscillation pattern occurring in a workpiece (W) afterwards from the measurement results of oscillation occurring in the workpiece (W) during conveyance by way of a workpiece conveyance device (2); controlling a robot (131) so as to operate at an oscillation according to the predicted oscillation pattern thus predicted; detecting oscillation occurring in the robot (131) during the step of controlling; and comparing the oscillation occurring in the robot (131) with the predicted oscillation pattern, and in the case of differing, adjusting so that the oscillation of the robot (131) matches the predicted oscillation pattern, in which each of these steps is completed before the robot (131) performs work on the workpiece (W).

4 Claims, 6 Drawing Sheets (51) Int. Cl.
*B65G 47/00* (2006.01)
*B62D 65/02* (2006.01)
*B62D 65/18* (2006.01)
*F16F 15/00* (2006.01)
*B23P 21/00* (2006.01)

(56) References Cited

U.S. PATENT DOCUMENTS

| | | | | |
|---|---|---|---|---|
| 3,958,682 | A * | 5/1976 | Martin | 198/341.05 |
| 4,033,403 | A * | 7/1977 | Seaton et al. | 164/155.3 |
| RE30,016 | E * | 5/1979 | Hohn | 700/253 |
| 4,183,427 | A * | 1/1980 | Tomikawa | 198/464.1 |
| 4,842,123 | A * | 6/1989 | Visser | 198/341.02 |
| 5,207,309 | A * | 5/1993 | Simpkin et al. | 198/341.09 |
| 5,257,899 | A * | 11/1993 | Asakura et al. | 198/468.4 |
| 6,001,003 | A * | 12/1999 | Park | 451/157 |
| 6,171,178 | B1 * | 1/2001 | Park | 451/159 |
| 6,966,166 | B2 * | 11/2005 | Kissling | 53/451 |
| 7,128,198 | B2 * | 10/2006 | Yoshida et al. | 198/468.4 |
| 7,854,061 | B2 * | 12/2010 | Kimura | 29/739 |
| 8,250,743 | B2 * | 8/2012 | Habisreitinger | 29/822 |
| 8,375,812 | B2 * | 2/2013 | Habisreitinger et al. | 73/865.8 |
| 8,386,069 | B2 * | 2/2013 | Hartmann et al. | 700/213 |
| 2004/0187442 | A1 * | 9/2004 | Kissling | 53/450 |
| 2005/0178641 | A1 * | 8/2005 | Yoshida et al. | 198/468.4 |
| 2009/0217514 | A1 * | 9/2009 | Kimura | 29/739 |
| 2011/0056071 | A1 * | 3/2011 | Kimura | 29/739 |
| 2013/0074329 | A1 * | 3/2013 | Matsuura | 29/832 |
| 2013/0309034 | A1 * | 11/2013 | Inagaki et al. | 409/132 |

FOREIGN PATENT DOCUMENTS

| | | | | |
|---|---|---|---|---|
| JP | | 4202953 | 12/2008 | |
| WO | WO 2004026537 | A2 * | 4/2004 | B25J 9/10 |
| WO | WO 2004026669 | A2 * | 4/2004 | B25J 9/10 |

OTHER PUBLICATIONS

Machine English translation of WO 2004026669.*

* cited by examiner

| | |
|---|---|
| ------- | OPERATION COMMAND (BEFORE ADJUSTMENT) |
| —·—·— | PREDICTED OSCILLATION PATTERN |
| ~~~~~ | ROBOT OSCILLATION (BEFORE ADJUSTMENT) |
| —··—··— | OPERATION COMMAND (AFTER ADJUSTMENT) |
| ▬▬▬ | ROBOT OSCILLATION (AFTER ADJUSTMENT) |

WORK METHOD AND WORK DEVICE

This application is based on and claims the benefit of priority from Japanese Patent Application No. 2012-153201, filed on 9 Jul. 2012, the content of which is incorporated herein by reference.

BACKGROUND OF THE INVENTION

1. Field of the Invention

The present invention relates to a work method and work device for performing work on a workpiece during workpiece conveyance.

2. Related Art

Industrial goods, for which vehicles may be representative, are manufactured by work robots sequentially performing various operations such as assembly and painting on a workpiece being conveyed using a conveyance device such as a conveyor. Conventionally, it has been common for the conveyance of a workpiece to be stopped in the vicinity of a work robot in order to appropriately perform various operations in such manufacturing processes; however, in recent years, attention has been given to attempts to perform work on workpieces without stopping the conveyance of the workpieces, from the viewpoint of working efficiency.

In a case of not stopping the conveyance of workpieces, it is necessary to fix the relative position relationship in the conveying direction between the work robot and the workpiece. Therefore, a synchronous conveyance device, as in Japanese Patent No. 4202953, has been known that enables work by the work robot on the workpiece to be done while maintaining the relative position relationship between the two, by causing the work robot to move synchronously with the conveyance of the workpiece.

Patent Document 1: Japanese Patent No. 4202953

SUMMARY OF THE INVENTION

In the case of conveying the workpiece with the conveyance device, a fixed oscillation will occur in the workpiece; however, Japanese Patent No. 4202953 does not consider the oscillations occurring in the work, and thus there has been margin for further improvement. More specifically, high precision positioning is demanded depending on the contents of the work, and a scheme to eliminate the oscillations occurring in the workpiece is demanded in such work.

The present invention has been made taking such demands into account, relates to a work method and work device that perform work on a workpiece during conveyance, and particularly has an object of providing a work method and work device that enable high precision work irrespective of the oscillations accompanying conveyance.

In order to achieve the above-mentioned object, the present invention is a work method for conducting work by a work device (e.g., the work device 1, robot 131 described later) on a work target (e.g., the workpiece W described later) being held and conveyed by way of a conveyance device (e.g., the workpiece conveyance device 2 described later), the method including the steps of: measuring oscillation occurring in the work target being conveyed, and predicting an oscillation pattern (e.g., the predicted oscillation pattern described later) occurring afterwards in the work target (e.g., the processing of Step S3 in FIG. 7 described later); controlling the work device so as to operate at an oscillation according to the oscillation pattern predicted (e.g., the processing of Step S4 in FIG. 7 described later); detecting oscillation occurring in the work device during the step of controlling (e.g., the processing of Step S5 in FIG. 7 described later); and comparing the oscillation detected with the oscillation pattern predicted, and in a case of the oscillation detected differing from the oscillation pattern predicted, adjusting the oscillation of the work device to match the oscillation pattern (e.g., the processing of Step S6 in FIG. 7 described later), in which each step is completed further upstream than work processing to perform work on the work target by the work device (e.g., completed prior to the processing of Step S7 in FIG. 7 described later).

With such a work method according to the present invention, an oscillation pattern occurring in the work target is reproduced in the work device prior to work processing on the work target. Since oscillations occurring in the work target between the work device and the work target are removed, it is thereby possible to reduce the decline in precision caused by the oscillations occurring in the work target accompanying conveyance, and thus, even if work in which high precision positioning is demanded, it is possible to perform reliably. In this case, the work method according to the present invention is configured not only to simply cause the oscillation pattern of the work target to be executed in the work device, but also to adjust so as to match in a case of the oscillation of the work device occurring accompanying this execution not matching the oscillation pattern. It is thereby possible to reproduce the oscillation occurring in the work target with high precision, a result of which high precision work can be performed even if oscillations occur in the work target accompanying conveyance.

In addition, the work process according to the present invention is characterized by further including a step of moving the work device synchronously with the work target being conveyed (e.g., affirmation of Step S1 in FIG. 7 described later).

It is thereby possible to maintain the relative position relationship between the work device and work target advancing along the conveying path, and it is possible to perform high precision work on the work target during conveyance.

In addition, a work device (e.g., the work device 1 described later) that conducts work on a work target (e.g., the workpiece W described later) being held and conveyed by a conveyance device (e.g., the workpiece conveyance device 2 described later) includes: an oscillation prediction part (e.g., the control part 15 that executes oscillation prediction control described later) that measures oscillation occurring in the work target being conveyed, and predicts an oscillation pattern occurring afterwards in the work target; an oscillation execution part (e.g., the portion of the robot 131 that performs work on the workpiece W described later) that controls an operating portion that conducts work on the work target so as to operate at an oscillation according to the oscillation pattern predicted; an oscillation detection part (e.g., the control part 15 that executes oscillation adjustment control described later) that detects oscillation occurring in the operating portion according to control by the oscillation execution part; and an oscillation adjustment part (e.g., the control part 15 that executes oscillation adjustment control described later) that compares the oscillation detected with the oscillation pattern predicted, and in a case of the oscillation detected and the oscillation pattern predicted differing, adjusts so that the oscillation of the operating portion matches with the oscillation pattern, in which work on the work target by the operating portion begins (e.g., begin processing of Step S7 in FIG. 7 described later) when oscillation matching the oscillation pattern occurs in the operating portion (when the processing of Step S6 in FIG. 7 described later ends).

In this case, the work device further includes a moving part (e.g., the moving part 11 described later) that moves synchronously with the work target being conveyed.

There are the same effects as the above-mentioned invention of a work method, according to the work device.

According to the present invention, it is possible to perform high precision work on a work target (workpiece) during conveyance, irrespective of the oscillations accompanying conveyance.

DETAILED DESCRIPTION OF THE INVENTION

Hereinafter, the most preferred modes for implementing the present invention will be explained based on the drawings.
Outline of Conveyance System 30

Figure 1:
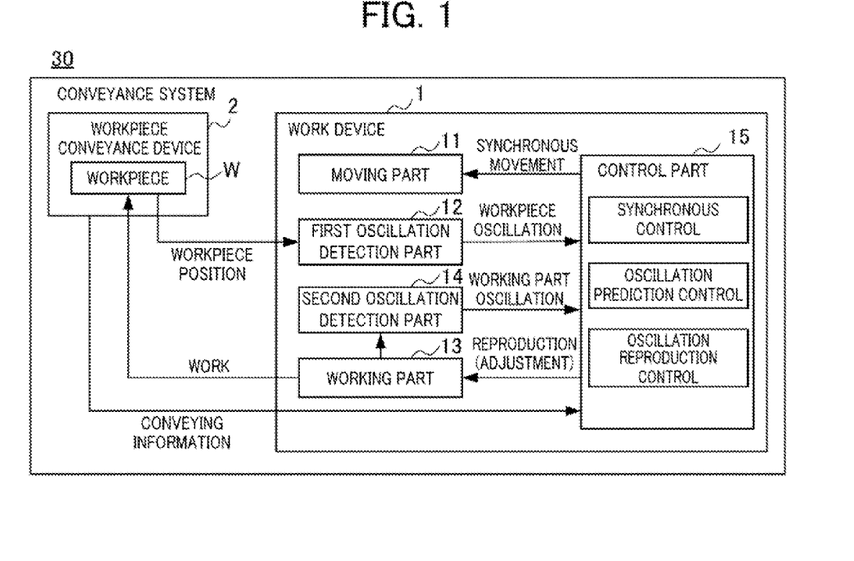
FIG. 1 a functional block diagram showing the functional configuration of a conveyance system.
Figure 2:
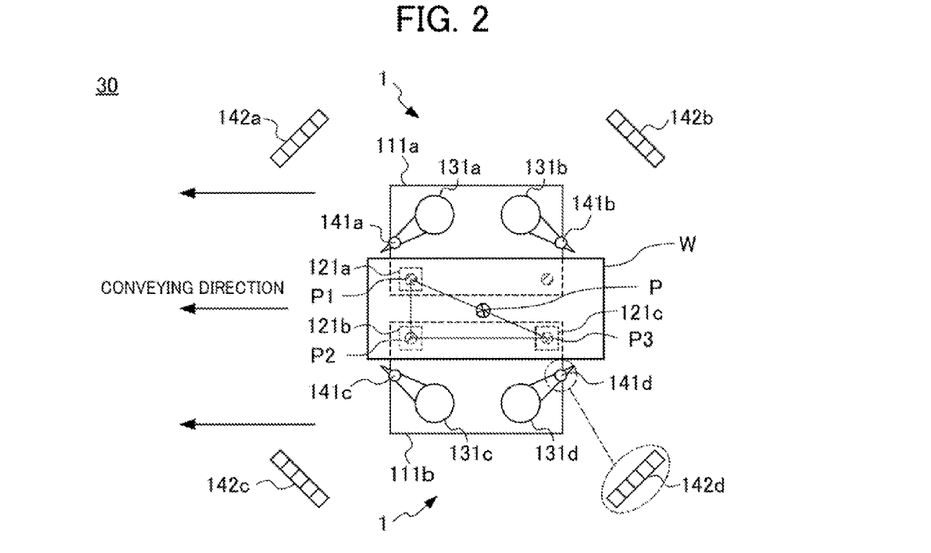
FIG. 2 is a schematic diagram schematically showing the conveyance system.

First, an outline of a conveyance system 30 implementing the present invention will be explained by referencing FIGS. 1 and 2. FIG. 1 is a functional block diagram showing the functional configuration of the conveyance system 30, and FIG. 2 is a schematic view schematically showing the conveyance system 30.

With reference to FIG. 1, the conveyance system 30 is configured to include a work device 1 that performs work on a workpiece W and a workpiece conveyance device 2 that conveys the workpiece W.

It should be noted that, as explained hereinafter, the present embodiment is configured to use the body of a vehicle on which painting processing had been completed as the workpiece W, and use an overhead conveyor that conveys by hanging the workpiece W from above as the workpiece conveyance device 2. At this time, the work device 1 performs work to detach a door temporarily fit for painting from the workpiece W conveyed by the workpiece conveyance device 2. Naturally, the workpiece W, workpiece conveyance device 2 and/or contents of work on the workpiece are merely exemplifications, and are not to be limited to these.

As shown in FIG. 1, the work device 1 is configured to include a moving part 11, first oscillation detection part 12, working part 13, second oscillation detection part 14 and control part 15, and performs predetermined work on the workpiece W while conveyed by the workpiece conveyance device 2.

The moving part 11 moves along the conveying direction of the workpiece W in accordance with the control of the control part 15. At this time, the moving part 11 moves synchronously with the workpiece W being moved along the conveying direction of the workpiece W, i.e. being conveyed by the workpiece conveyance device 2, at the same speed as the conveying speed of the workpiece W.

With reference to FIG. 2, the moving part 11 includes carts 111a, 111b, which move on rails 112a, 112b (refer to FIG. 4, etc., hereinafter referred to as "rails 112" in cases not distinguishing each) provided parallel to the conveying direction of the workpiece W, for example. It should be noted that the present embodiment is configured to use the two carts 111a, 111b (hereinafter referred to as "carts 111" in cases not distinguishing each) on both sides of the workpiece W in order to perform the work to detach the door from the workpiece W (body).

The first oscillation detection part 12 detects oscillations occurring in the workpiece W accompanying conveyance by the workpiece conveyance device 2. As one example, the first oscillation detection part 12 is a sensor device that detects positional information of an arbitrary point on the workpiece W, and detects oscillations occurring in the workpiece W from the change in positional information detected by cooperating with the control part 15.

Herein, as shown in FIG. 2, in the present embodiment, positional information of a position P, which is at a bottom central part, and oscillations are detected from arbitrary positions P1, P2 and P3 (for example, 3 locations in the vicinity of a hole for welding provided at the bottom) on the bottom of the workpiece W. Therefore, in the present embodiment, sensor devices 121a, 121b and 121c (hereinafter referred to as "sensor devices 121" in cases not distinguishing each) are installed at a top surface of the carts 111, and it is configured so as to detect positional information of positions P1, P2 and P3 (hereinafter referred to as "position Pn" in cases not distinguishing each) from below the workpiece W moving synchronously with the carts 111. As one example, the sensor device 121a detecting the positional information of the position P1 is installed at an arbitrary position on a downstream side in the conveying direction in the cart 111a, the sensor device 121b detecting the positional information of the position P2 is installed at an arbitrary position on a downstream side in the conveying direction in the cart 111b, and the sensor device 121c detecting the positional information of the position P3 is installed at an arbitrary position on a downstream side in the conveying direction in the cart 111b.

It should be noted that it is preferable to detect positional information of 3 axes (X, Y and Z axes) in order to perform work to eliminate oscillations occurring in the workpiece W. For this reason, the present embodiment is configured so as to use, as a sensor device 121, a laser displacement gauge that detects positional information on the Z axis (vertical direction) of the position Pn and a 2-D real-time camera that detects the positional information on the X,Y axes (horizontal plane) of the position Pn.

The working part 13 is a work robot configured by an articulated manipulator, and performs predetermined work on the workpiece W under the control of the control part 15. In addition, the working part 13 is installed on the top of the moving part 11, and moves in the conveying direction synchronously with the workpiece W accompanying the movement of the moving part 11.

Herein, as shown in FIG. 2, in the present embodiment, since the working part 13 performs work to remove the door from the workpiece W, the four robots 131a, 131b, 131c and 131d are installed two per side of the workpiece W. In other words, the robots 131a, 131b are installed to the cart 111a, and the robots 131c, 131d are installed to the cart 111b. It should be noted that, hereinafter, it is referred to as simply as "robot 131" in cases not distinguishing each.

The second oscillation detection part 14 detects oscillations occurring in the working part 13. As one example, the second oscillation detection part 14 is a sensor device that detects positional information of the working part 13, and detects oscillations occurring at the leading end of the working part 13 from the change in positional information detect by cooperating with the control part 15.

Herein, the present embodiment is configured to detect positional information of the working part 13 by an ultrasonic sensing method. It should be noted that ultrasonic sensing method is a method of receiving ultrasonic waves sent from a sender unit by a plurality (at least three) of receiver units, and detecting positional information by trilateration using the difference in the arrival times of the ultrasonic waves to each receiver unit. Therefore, as shown in FIG. 2, the second oscillation detection part 14 of the present embodiment is configured to include ultrasonic wave sender units 141$a$, 141$b$, 141$c$ and 141$d$ that are installed to the respective robots 131 and send ultrasonic waves, and ultrasonic receiver units 142$a$, 142$b$, 142$c$ and 142$d$ that are installed at arbitrary positions along the conveying path and receive ultrasonic waves. It should be noted that these are referred to hereinafter as "ultrasonic wave sender unit 141" and "ultrasonic wave receiver unit 142" in cases not distinguishing each. In this case, each of the ultrasonic wave receiver units 142 includes three receiver parts, and detects positional information of the ultrasonic wave sender units 141 by receiving ultrasonic waves sent from the corresponding ultrasonic wave sender unit 141 by the three receiving parts. In other words, the ultrasonic wave receiver unit 142$a$ detects positional information of the ultrasonic wave sender unit 141$a$, the ultrasonic wave receiver unit 142$b$ detects positional information of the ultrasonic wave sender unit 141$b$, the ultrasonic wave receiver unit 142$c$ detects positional information of the ultrasonic wave sender unit 141$c$, and the ultrasonic wave receiver unit 142$d$ detects positional information of the ultrasonic wave sender unit 141$d$. It should be noted that the work to eliminate oscillations occurring in the workpiece W by the robot 131 on the workpiece W during conveying, by causing the oscillations occurring in the workpiece W to be reproduced in the robot 131 is enabled by the present invention. For this reason, the ultrasonic wave sender units 141 are preferably installed at a portion performing work on the workpiece W, for example, in the vicinity of the holding part that holds the workpiece W, the bolt operational part that loosens/tightens bolts of the workpiece W, etc. (hereinafter referred to as "operating portion"), ideally at the leading end of the robot 131. In addition, in a case of the robot 131 including a plurality of operating portions, it is preferable to include the ultrasonic wave sender unit 141 in the vicinity of each of the plurality of operating portions.

The control part 15 is a control unit that controls unifyingly controls the work device 1, and as one example, the control part 15 controls the moving part 11 so as to move the work device 1 along the conveying direction, and controls the working part 13 so as to perform predetermined work on the workpiece W. In addition, the control part 15 controls the work device 1 to execute synchronous control, oscillation prediction control and oscillation reproduction control.

Herein, synchronous control refers to control that causes the moving part 11 to move synchronously with the workpiece W conveyed by the workpiece conveyance device 2. Although a suitable method can be employed appropriately as the method of synchronous control, in the present embodiment, an encoder (not illustrated) is provided to the workpiece conveyance device 2, and it is configured so as to perform synchronous control by controlling the moving part 11 based on a signal from this encoder.

In addition, oscillation prediction control refers to control that predicts oscillations occurring in the workpiece W conveyed by the workpiece conveyance device 2. Oscillations having a fixed periodicity occur in the workpiece W conveyed by the workpiece conveyance device 2. Therefore, the control part 15 predicts the oscillations occurring in the workpiece W from when the oscillation of a predetermined period detected by the first oscillation detection part 12. It should be noted that the predetermined period can be set to an arbitrary period as appropriate, so long as being a period allowing prediction of the oscillation of the workpiece W. In addition, after prediction of oscillation, it may be configured so as to correct the oscillation predicted by the oscillation prediction control, using the oscillation detected by the first oscillation detection part 12. Hereinafter, oscillation of the workpiece W predicted by oscillation prediction control is referred to as "predicted oscillation pattern".

In addition, oscillation reproduction control refers to control to cause the oscillation according to the predicted oscillation pattern to be reproduced in the working part 13, i.e. the operating portion of the robot 131 serving as the working part 13. It should be noted that the working part 13 moves in the conveying direction by way of the moving part 11; therefore, there is a possibility of an oscillation different from the workpiece W conveyed by the workpiece conveyance device 2 occurring, a result of which, even if attempting to reproduce the oscillation of the workpiece W in the working part 13, there is a possibility of oscillation different from the predicted oscillation pattern occurring in the working part 13. Therefore, in the present embodiment, it is configured so as to perform oscillation reproduction control in the two stages of oscillation execution control and oscillation adjustment control.

It should be noted that oscillation execution control refers to control to cause the working part 13 to oscillate according to the predicted oscillation pattern. More specifically, the control part 15 supplies a control signal matching the predicted oscillation pattern to the working part 13, and controls so that the operating portion of the robot 131 serving as the working part 13 oscillates at the predicted oscillation.

In addition, oscillation adjustment control is control that adjusts a difference between the oscillation occurring in the working part 13 by way of oscillation execution control and oscillation predicted by the oscillation prediction control. More specifically, the control part 15 detects the oscillation occurring in the working part 13 in cooperation with the second oscillation detection part 14 during oscillation execution control, compares the detected oscillation with the predicted oscillation pattern, and in a case of both not matching, adjusts the oscillation of the working part 13 so as to match with the predicted oscillation pattern.

It should be noted that the details of oscillation reproduction control will be described later with FIG. 8.

Specific Configuration of Conveyance System 30

Figure 3:
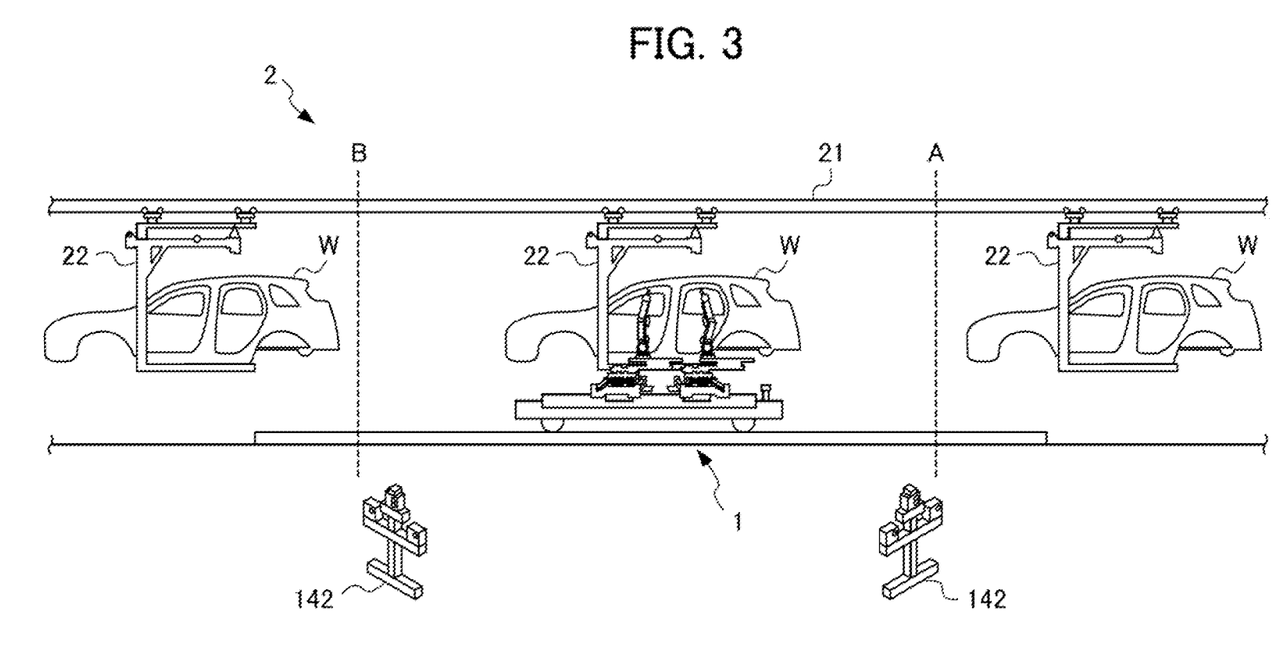
FIG. 3 is a side view of the conveyance system.
Figure 4:
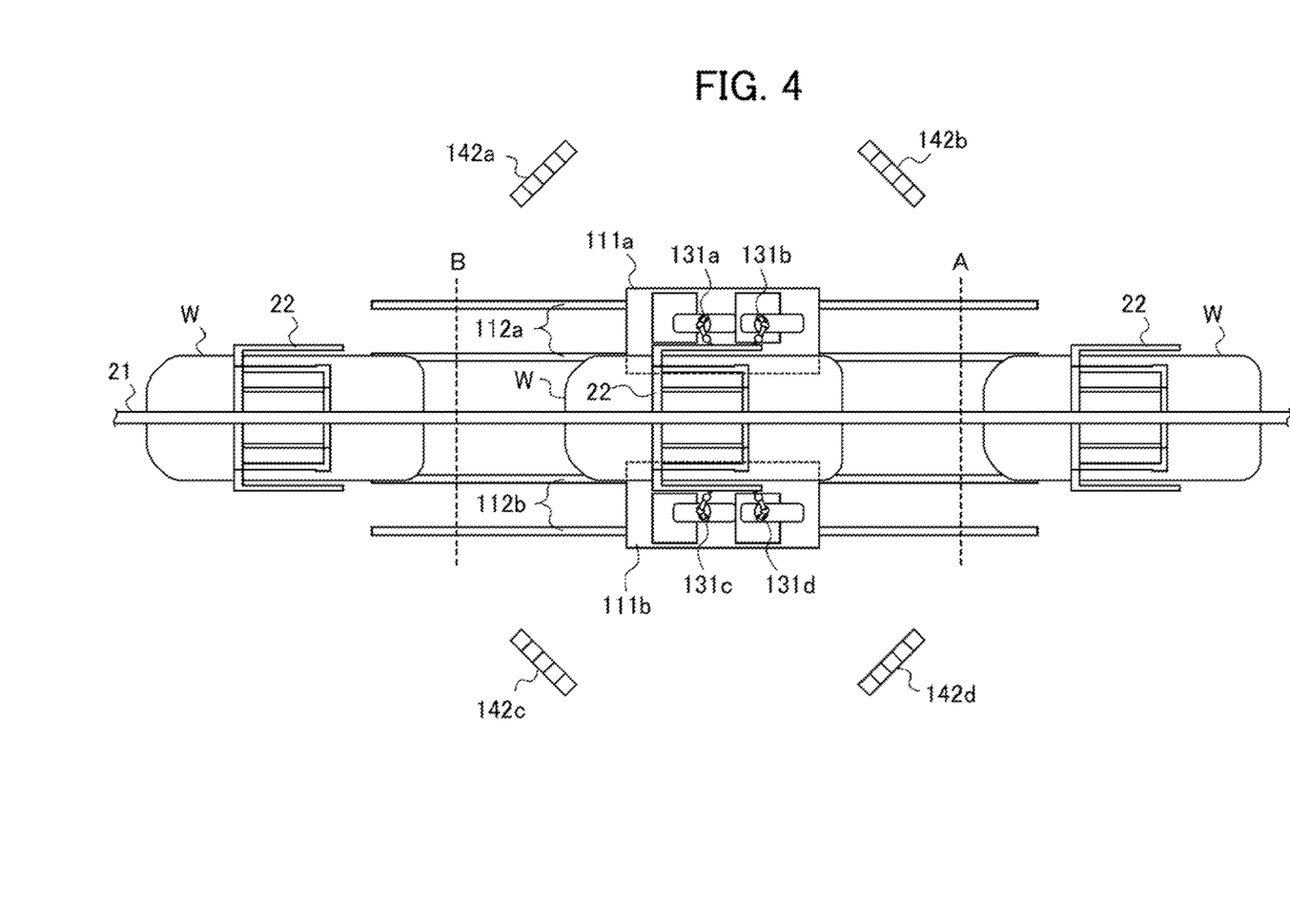
FIG. 4 is a plan view of the conveyance system.
Figure 5:
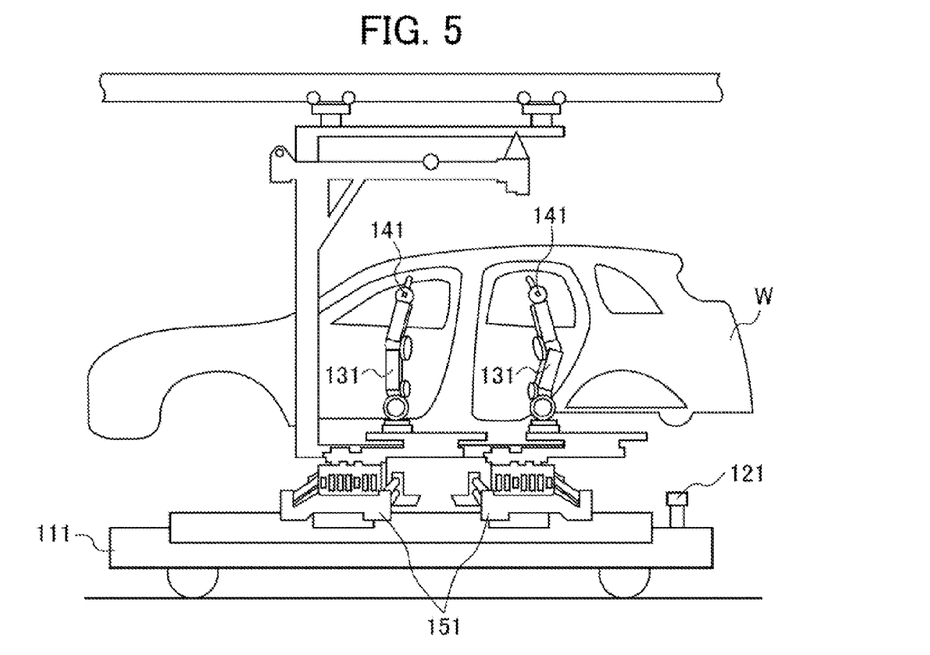
FIG. 5 is a side view of a work device constituting the conveyance system.
Figure 6:
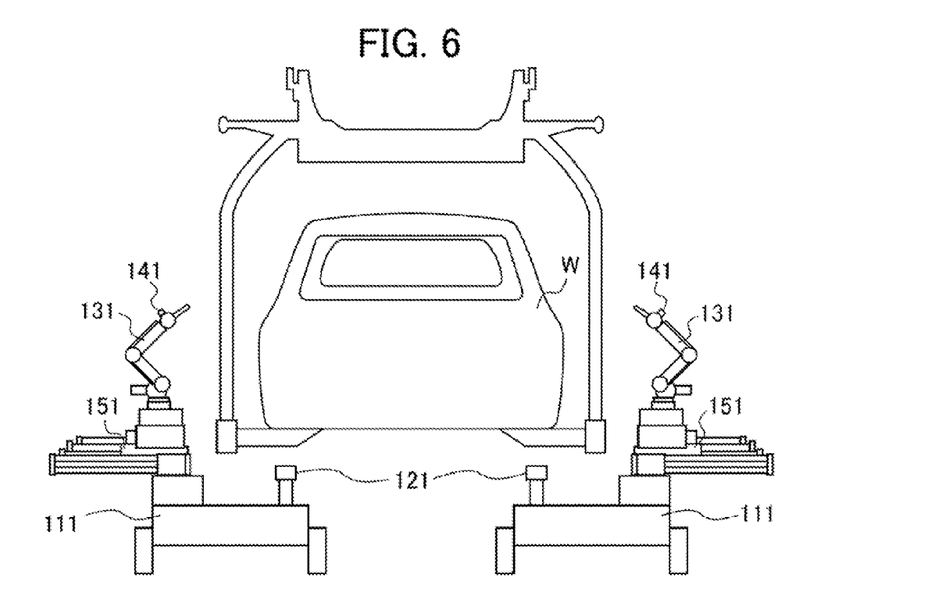
FIG. 6 is a back view of the work device constituting the conveyance system.

Next, one embodiment of the conveyance system 30 implementing the present invention will be explained while referencing FIGS. 3 to 6. FIG. 3 is a side view of the conveyance system 30, and FIG. 4 is a plan view of the conveyance system 30. In addition, FIG. 5 is a side view of the work device 1 configuring the conveyance system 30, and FIG. 6 is a back view of the work device 1.

Referring to FIGS. 3 and 4, the conveyance system 30 is configured to include the work device 1 that performs work on the workpiece W, and the workpiece conveyance device 2 that conveys the workpiece W. Between points A-B in the drawings indicates a station that performs work on the workpiece W.

The workpiece conveyance device 2 constitutes a part of the manufacturing line of the body (workpiece W) of a vehicle, and is an overhead conveyor in the present embodiment. More specifically, the workpiece conveyance device 2 is configured to include a support rail 21 provided along the conveying path, and a hanger 22 that moves suspended from the support rail 21. In addition, a chain (not illustrated) is provided to the support rail 21, and the hanger 22 is towed by this chain being guided to move in the support rail 21.

As shown in FIG. 4, the work device 1 is configured to include the carts 111 as the aforementioned moving parts 11, and rails 112. The rails 112 are provided along the conveying path of workpieces W, and restricts movement of the carts 111. In addition, the cart 111 includes a motor (not illustrated), and moves from point A to point B on the rail 112 accompanying a pulse signal supplied from the control part 15. More specifically, the cart 111 starts synchronization with the workpiece W from point A and moves until point B. Subsequently, upon arriving at point B, releases synchronization with the workpiece W, moves to point A, and starts synchronization with the next workpiece W. It should be noted that FIGS. 3 and 4 are illustrated by simplifying as appropriate the interval between previous and next workpieces W and the distance between points A-B for convenience of explanation.

In addition, ultrasonic wave receiver units 142 that constitute a part of the aforementioned second oscillation detection part 14 are installed at predetermined positions between points A-B. Each of the ultrasonic wave receiver units 142 receives ultrasonic waves sent from the ultrasonic wave sender units 141 (refer to FIG. 5) mounted to the operating portion of the robot 131, and acquire positional information of the operating portion.

In addition, as shown in FIGS. 5 and 6, the sensor device 121 as the aforementioned first oscillation detection part 12, the robot 131 as the aforementioned working part 13 and the control unit 151 as the aforementioned control part 15 are installed at the top surface of the cart 111.

The sensor device 121 is installed at a position on the top surface of the cart 111 below the workpiece W, and acquires positional information of an arbitrary position Pn on the bottom of the workpiece W. For example, the sensor device 121 measures the distance to the bottom of the workpiece W by irradiating predetermined laser light upwards, and the sensor device 121 measures the amount of movement of the position Pn in the horizontal direction by observing the arbitrary position Pn on the bottom of the workpiece W. Then, the sensor device 121 acquires positional information in three axial directions, i.e. three dimensions, of the position Pn from the distance until the bottom of this workpiece W and the amount of movement in the horizontal direction.

The robot 131 is installed on the top surface of the cart 111, and is a work robot that performs predetermined work on the workpiece W that is in synchronous conveyance with the cart 111 from a lateral side. In addition, the robot 131 is a work robot that is configured from an articulated manipulator in which a plurality of joints rotate and move independently, and includes the ultrasonic wave sender unit 141 at an arbitrary position at a leading end. It should be noted that arbitrary position of a leading end is in the vicinity of the operating portion that performs work on the workpiece W, and is a position that must not hinder the work by the operating portion.

This ultrasonic wave sender unit 141 configures the aforementioned second oscillation detection part 14 along with the ultrasonic wave receiver unit 142, and is configured to be able to detect positional information of a portion at which the ultrasonic wave sender unit 141 is installed and a change (i.e. oscillation) in the positional information, by sending ultrasonic waves to a corresponding ultrasonic wave receiver unit 142.

The control unit 151 unifyingly controls the work device 1, i.e. controls movement of the cart 111, operations of the robot 131, etc. It should be noted that the control unit 151 can be configured from one or a plurality of devices, and for example, a number of devices corresponding with the carts 111 and robots 131 may be provided, and the carts 111 and robots 131 may be controlled with only one device.

In addition, the control unit 151 specifies positional information of the hanger 22 hanging the workpiece W based on a signal from an encoder (not illustrated) provided to the workpiece conveyance device 2, and performs the aforementioned synchronous control based on this positional information, i.e. controls movement of the cart 111 so as to synchronously move with the workpiece W. In addition, when the sensor device 121 detects oscillation of the workpiece W over a predetermined time period, the control unit 151 performs the aforementioned oscillation prediction control based on the detected oscillation in the predetermined period, i.e. predicts the predicted oscillation pattern occurring in the workpiece W afterwards. In addition, the control unit 151 performs oscillation reproduction control based on the predicted oscillation pattern predicted by oscillation prediction control, i.e. causes the robot 131 to oscillate so as to match the predicted oscillation pattern of the workpiece W. In this case, the control unit 151 measures oscillation of the robot 131 in cooperation with the ultrasonic wave sender unit 141 and ultrasonic wave receiver unit 142, and in the case of the oscillation of the robot 131 differing from the predicted oscillation pattern, adjusts the oscillation of the robot 131 so as to match.

Operation of Conveyance System 30

Next, operation of the conveyance system 30 will be explained while referencing FIGS. 7 and 8. FIG. 7 is the time flow showing the flow of operations of the conveyance system 30, and FIGS. 8A, 8B, 8C and 8D are illustrations showing the relationship between the oscillations of the workpiece W and oscillations of the robot 131.

Figure 7:
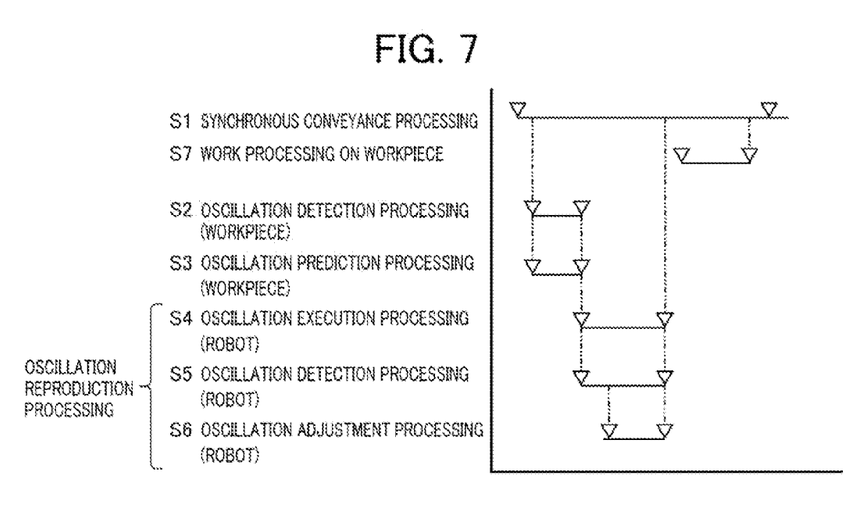
FIG. 7 is a time flow showing the flow of operations of the conveyance system.

Referring to FIG. 7, the control unit 151 as the control part 15 starts synchronous conveyance processing that causes the cart 111 to move synchronously with the workpiece W that is the work target, as shown in Step S1. In other words, the control unit 151 controls the cart 111 so as to move synchronously with the workpiece W that is the work target between points A-B, based on the signal from the encoder provided to the workpiece conveyance device 2. This synchronous conveyance processing of Step S1 is performed continuously until the work on the workpiece W that is the work target ends, i.e. until the processing of Step S2 to Step S7 explained below ends.

Next, in Step S2, the control unit 151 starts oscillation detection processing on the workpiece W to detect the oscillation of the workpiece W during synchronous conveyance in cooperation with the sensor device 121 as the first oscillation detection part 12. In other words, the control unit 151 acquires three-dimensional positional information of the position P, which is at the bottom, center of the workpiece W, from the positional information of positions P1, P2 and P3 detected by the sensor devices 121. Then, the control unit 151 detects oscillations occurring at the position P from the change in positional information of this position P. This oscillation detection processing on the workpiece W in Step S2 is performed continuously for a predetermined time period sufficient to predict the future oscillations. It should be noted that the predetermined time period can be set as appropriate depending on the type of workpiece W and the type of work conveyance system 2.

Next, in Step S3, the control unit 151 starts oscillation prediction processing to predict the oscillations occurring afterwards in the workpiece W, from the oscillation of the workpiece W detected in Step S2. It is predicted that oscillations having a constant periodicity unless an external force is imparted will occur in the workpiece W being conveyed by the workpiece conveyance device 2. Therefore, the control unit 151 predicts the oscillations occurring afterwards in the workpiece W, i.e. calculates the predicted oscillation pattern, by specifying the periodicity of the oscillations occurring in the workpiece W, from the oscillations of the workpiece W in a predetermined time period detected in Step S2.

When the predicted oscillation pattern is calculated, the control unit 151 starts oscillation reproduction processing to cause oscillation in accordance with the predicted oscillation pattern to continually be reproduced in each of the robots 131. It should be noted that this oscillation reproduction processing is realized by the respective processing of Step S4 to Step S6.

More specifically, the control unit 151 first starts oscillation execution processing of Step S4, when the predicted oscillation pattern is calculated. In this oscillation execution processing, the control unit 151 supplies an operation command to the robot 131 so as to oscillate in accordance with the predicted oscillation pattern. Herein, the oscillation execution processing in a case of a predicted oscillation pattern L2 represented by the two-dot dashed line in the drawing being calculated will be explained while referencing FIG. 8. As shown in FIG. 8(A), the control unit 151 generates an operation command for the robot 131 so that the operation of the robot 131 matches the waveform of the oscillation indicated by the predicted oscillation pattern L2. At this time, the control unit 151 generates an operation command L1 sending a command earlier than the predicted oscillation pattern L2 by the amount of the response time, while taking account of the response time from supplying the operation command until the robot 131 actually operates. The robot 131 operates according to this operation command L1, whereby the oscillation execution processing of Step S4 is realized. It should be noted that this oscillation execution processing of Step S4 is performed continuously until reproduction of oscillation according to the predicted oscillation pattern in the robot 131 ends, i.e. until the processing of Step S6 explained below ends.

However, even if the robot 131 operates in accordance with the operation command, oscillation matching the predicted oscillation pattern will not necessarily occur in the robot 131. As one example, oscillation accompanying the movement of the cart 111 is imparted to the robot 131, and in the case of a plurality of the robots 131 being installed on the cart 111, there is a possibility of the influence of the oscillations occurring in another robot 131 being received, and the oscillation differing from the predicted oscillation pattern occurring. Therefore, in the present embodiment, the control unit 151 observes the oscillations occurring in the robot 131 by way of the processing of Step S4, and in the case of not matching the predicted oscillation pattern, tries to adjust so as to match.

More specifically, as shown in Step S5 of FIG. 7, when the control unit 151 supplies an operation command to the robot 131, it starts oscillation detection processing to measure and detect oscillations occurring in the robot 131 in accordance with the operation command, in cooperation with the ultrasonic wave sender unit 141 and ultrasonic wave receiver unit 142 as the second oscillation detection part 14. More specifically, the control unit 151 acquires positional information of the robot 131 by way of the ultrasonic sensing method in cooperation with the ultrasonic wave sender unit 141 and ultrasonic wave receiver unit 142. Then, the control unit 151 detects oscillations occurring in the robot 131 from the change in positional information of the robot 131.

Next, in Step S6, when detection of oscillations of the robot 131 is performed, the control unit 151 starts oscillation adjustment processing to adjust so that the oscillation occurring in the robot 131 matches the predicted oscillation pattern. In this oscillation adjustment processing, the oscillation of the robot 131 at an arbitrary time and the predicted oscillation pattern corresponding with this time are compared. Then, if the robot 131 is delayed as a result of this comparison, it is adjusted so that the readout timing of the operation command by the robot 131 is accelerated, or the operation command is supplied more quickly to the robot 131. On the other hand, if the robot 131 is ahead as a result of the comparison, it is adjusted so that the readout timing of the operation command by the robot 131 is delayed, or the operation command is supplied later to the robot 131.

Figure 8A:
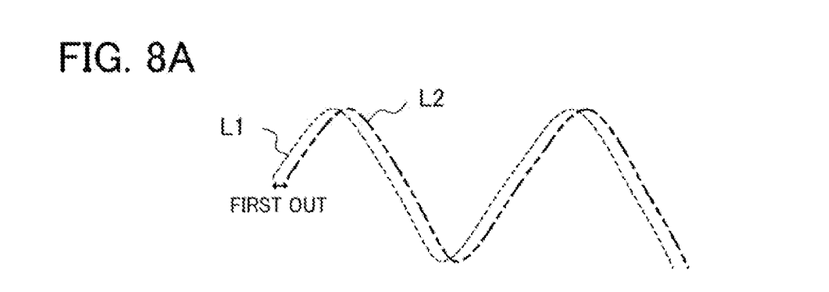
FIGS. 8A, 8B, 8C and 8D are illustrations showing the relationship between the oscillations of a workpiece being conveyed and oscillations of a robot.
Figure 8B:
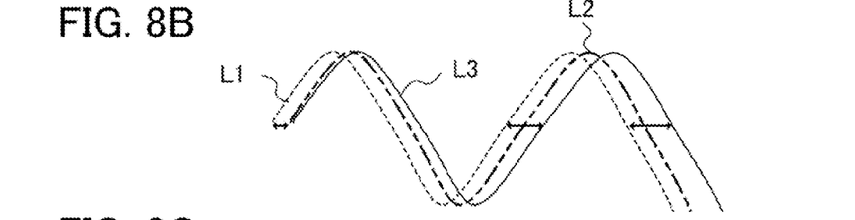

Referring to FIG. 8(B), the solid line in the drawing is an oscillation L3 occurring in the robot 131 by operating in accordance with the operation command L1 in FIG. 8(A). As shown in FIG. 8(B), although the oscillation L3 matching the predicted oscillation pattern L2 occurs in the robot 131 at first by operating in accordance with the operation command L1, as time elapses, the oscillation L3 of the robot 131 has a gradual delay occurring relative to the predicted oscillation pattern L2.

Figures 8C, 8D:
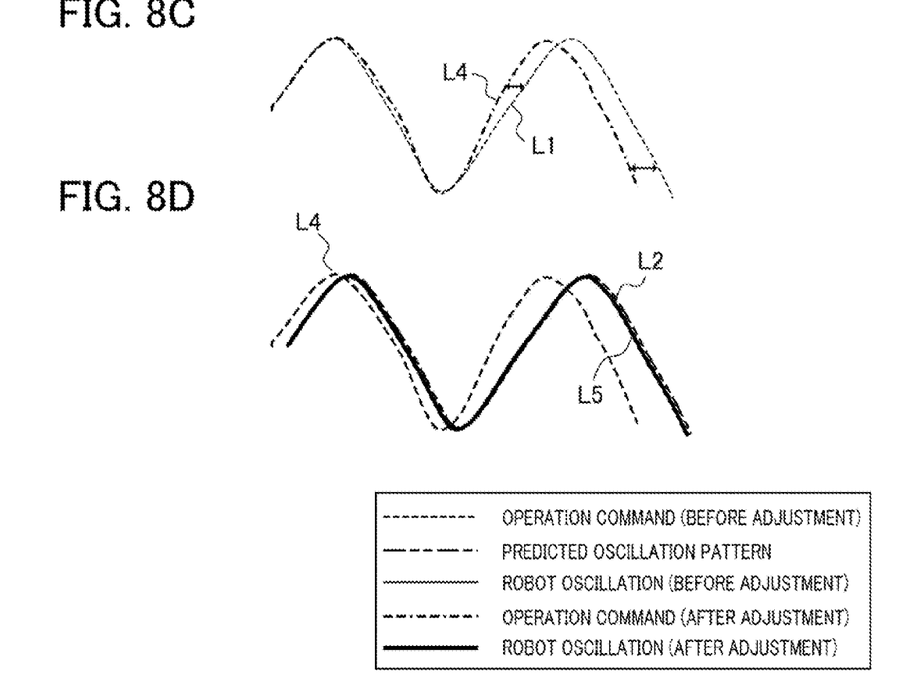

Therefore, as shown in FIG. 8(C), the control unit 151 adjusts so as to supply the operation command earlier to the robot 131. In FIG. 8(C), the operation command L1 generated in Step S4 is adjusted to the operation command L4 making a command to the robot 131 earlier. A shown in FIG. 8(D), the oscillation L3 of the robot 131 that is delayed relative to the predicted oscillation pattern L2 is adjusted to the oscillation L5 that matches the predicted oscillation pattern L2.

Referring back to FIG. 7, when oscillations according to the predicted oscillation patterns are reproduced in each of the robots 131, the control unit 151 starts the work processing to perform work on the workpiece W during synchronous conveyance, in Step S7. More specifically, the control unit 151 causes the robot 131 in which the oscillation of the workpiece W is reproduced to directly or indirectly come into contact with the workpiece W, and to perform predetermined work such as removing a door, for example, on the workpiece W. When the work on the workpiece W ends, the control unit 151 separates the robot 131 from the workpiece W and ends the work processing.

When this work processing of Step S7 ends, the control unit 151 ends the work on this workpiece W, and performs preparation for work on the next workpiece W, by moving the cart 111 from point B to point A.

With the above such conveyance system 30, oscillation occurring in the workpiece W is made to be reproduced in the operating portion of the robot 131, prior to performing work on the workpiece W. It is thereby possible to eliminate the influence of oscillation between the robot 131 and workpiece W since the same oscillation as the oscillation occurring in the workpiece W occurs in the robot 131. As a result thereof, it is possible to appropriately position the operating portion of the robot 131 relative to the workpiece W, and high precision work can be performed on the workpiece W during conveyance.

In this case, the present embodiment is configured not only to simply cause the predicted oscillation pattern of the workpiece W to be executed in the robot 131, but also to adjust so as to match in a case of the oscillation of the robot 131 occurring accompanying this execution not matching the predicted oscillation pattern. It is thereby possible to reproduce the oscillation occurring in the workpiece W with high precision, a result of which high precision work can be performed even if oscillations occur in the workpiece W accompanying conveyance.

In addition, since oscillations occurring in the workpiece W can be eliminated not by imparting changes to the workpiece W and the workpiece conveyance device 2, but rather only a change to the robot 131 for work, it is not necessary to modify existing manufacturing lines.

The conveyance system 30 according to the present embodiment has been explained above. It should be noted that the present invention is not to be limited to the above-mentioned embodiment, and that modifications, improvements, etc. within a scope that can achieve the object of the present invention are included in the present invention.

For example, although the above-mentioned embodiment is explained giving one example with the carts 111 and rails 112 as the moving part 11, the moving part 11 is not limited thereto, and may be realized by another configuration. In this case, it is sufficient so long as the moving part 11 has a working part 13 that performs work on the workpiece W, i.e. operating portion provided at the leading end of the robot 131, synchronized with the workpiece W along the conveying direction. More specifically, the moving part 11 may be a configuration that causes the working part 13 itself to move like the cart 111 on which the working part 13 is installed as in the above-mentioned embodiment, and may be a configuration in which the working part 13 itself does not move, but rather only the operating portion that performs the work on the workpiece W moves. As a configuration in which only the operating portion moves, a work robot equipped with an arm of a predetermined length and fixedly installed at an arbitrary position is exemplified. Although such a work robot does not move on its own, it is configured so the operating portion is movable between points A-B by expanding and contracting the arm or bending the joints.

In addition, in the above-mentioned embodiment, the first oscillation detection part 12 is configured to detect the positional information of the position P from three arbitrary points (positions P1, P2 and P3) on the bottom of the workpiece W; however, it is not limited thereto, and may be configured to detect the positional information of the position P from the positions of three or more points as necessary.

Furthermore, it is sufficient so long as the first oscillation detection part 12 can detect oscillations occurring in the workpiece W, and is not limited to the sensor device 121 as in the above-mentioned embodiment, and may be realized by another configuration. For example, it may be configured to photograph the workpiece W by way of an imaging device such as a camera, and to detect oscillations occurring in the workpiece W by analyzing a captured dynamic picture image.

In addition, by attaching various sensors such as an acceleration sensor, angular velocity sensor and geomagnetic sensor to the hanger 22 conveying the workpiece W, it may be configured to detect oscillation of the hanger 22 and use this oscillation of the hanger 22 as the oscillation of the workpiece W. In addition, it may be configured to detect the oscillation occurring in the workpiece W by attaching various sensors such as this acceleration sensor to the workpiece W itself. Even if such a configuration, modifications to existing manufacturing lines can be done minimally, and it is possible to suitably employ existing equipment.

In addition, similarly to the second oscillation detection part 14, it is sufficient so long as able to detect oscillations occurring in the operating portion of the working part 13, and is not limited to the ultrasonic sensing method like the above-mentioned embodiment. For example, it may be configured to detect oscillations by attaching various sensors such as an acceleration sensor to the operating portion of the working part 13, and it may be configured to detect oscillations by photographing the operating portion with a camera or the like, and analyzing the dynamic picture image.

In addition, the second oscillation detection part 14 may be configured so as not to require detecting oscillation from all of the operating portions performing work on the workpiece W, and thus not to detect oscillation depending on the contents of work, or to vary the detection precision. For example, upon removing a door from the workpiece W, the high precision reproduction of oscillations is demanded in the bolt actuator, etc. that loosens/fastens bolts, while the high precision reproduction of oscillations is not demanded in the holding part, etc. that holds the door until then. Therefore, the second oscillation detection part 14 may be configured to change the detection method for oscillations of the operating portion depending on the contents of the work, and may be configured to change the precision during oscillation reproduction.

What is claimed is:

1. A work method for conducting work by a work device on a work target being held and conveyed by way of a conveyance device, the method comprising the steps of:
   measuring oscillation occurring in the work target being conveyed, and predicting an oscillation pattern occurring afterwards in the work target by specifying a periodicity of the oscillation occurring in the work target;
   controlling the work device so as to operate at an oscillation according to the oscillation pattern predicted;
   detecting oscillation occurring in the work device during the step of controlling; and
   comparing the oscillation detected with the oscillation pattern predicted, and in a case of the oscillation detected differing from the oscillation pattern predicted, adjusting the oscillation of the work device to match the oscillation pattern, wherein each step is completed further upstream than work processing to perform work on the work target by the work device.

2. The work method according to claim 1, further comprising a step of moving the work device synchronously with the work target being conveyed.

3. A work device that conducts work on a work target being held and conveyed by a conveyance device, the work device comprising:
   an oscillation prediction part that measures oscillation occurring in the work target being conveyed, and predicts an oscillation pattern occurring afterwards in the work target by specifying a periodicity of the oscillation occurring in the work target;
   an oscillation execution part that controls an operating portion that conducts work on the work target so as to operate at an oscillation according to the oscillation pattern predicted;
   an oscillation detection part that detects oscillation occurring in the operating portion according to control by the oscillation execution part; and
   an oscillation adjustment part that compares the oscillation detected with the oscillation pattern predicted, and in a case of the oscillation detected and the oscillation pattern predicted differing, adjusts so that the oscillation of the operating portion matches with the oscillation pattern, wherein work on the work target by the operating portion begins when oscillation matching the oscillation pattern occurs in the operating portion.

4. The work device according to claim 3, further comprising a moving part that moves synchronously with the work target being conveyed.

\* \* \* \* \*